United States Patent
Raja

(10) Patent No.: US 8,957,388 B2
(45) Date of Patent: Feb. 17, 2015

(54) COMPENSATABLE MUON COLLIDER CALORIMETER WITH MANAGEABLE BACKGROUNDS

(71) Applicant: Rajendran Raja, Naperville, IL (US)

(72) Inventor: Rajendran Raja, Naperville, IL (US)

(73) Assignee: Fermi Research Alliance, LLC, Batavia, IL (US)

( * ) Notice: Subject to any disclaimer, the term of this patent is extended or adjusted under 35 U.S.C. 154(b) by 96 days.

(21) Appl. No.: 13/713,134

(22) Filed: Dec. 13, 2012

(65) Prior Publication Data

US 2014/0166892 A1 Jun. 19, 2014

(51) Int. Cl.
G01J 1/42 (2006.01)
G01T 1/00 (2006.01)
G01T 7/00 (2006.01)

(52) U.S. Cl.
CPC ...................... G01T 7/005 (2013.01)
USPC ........................................................ 250/395

(58) Field of Classification Search
CPC .................. G01T 1/17; G01T 7/005
USPC ........................................................ 250/395
See application file for complete search history.

(56) References Cited

U.S. PATENT DOCUMENTS 4,755,742 A 7/1988 Agoston et al.
5,079,532 A 1/1992 Bonanos

OTHER PUBLICATIONS

R. Lipton, "Muon Collider: Plans, Progress and Challenges", Proceedings of the DPF-2011 Conference, Providence, RI, Aug. 8-13, 2011.*

R. Raja, "Towards a Compensatable Muon Collider Calorimeter with Manageable Backgrounds" Powerpoint presentation slides presented at LCWS11, Granada, Spain, Sep. 28, 2011, downloaded May 8, 2014 from http://agenda.linearcollider.org/contributionDisplay.py?sessionId=33&contribId=26&confId=5134.*

R. Raja, "Towards a Compensatable Muon Collider Calorimeter with Manageable Backgrounds" Powerpoint presentation slides presented at Muon Collider 2011: Physics—Detectors—Accelerators, Telluride, Colorado, Jun. 29, 2011, downloaded May 8, 2014 from https://indico.fnal.gov/conferenceOtherViews.py?view=standard&confId=4146.*

Alexahin, Y. I. et al., "Muon collider interaction region design," Physical Review Special Topics—Accelerators and Beams (2011) 14:061001-1-061001-7.

Mokhov, N. V., "The MARS Code System User's Guide Version 13(95)," Fermi National Accelerator Laboratory Apr. 25, 1995, Batavia, IL, FERMILAB-FN-628, 58 pages.

Mokhov, N. V. et al., "Detector Background at Muon Colliders," Fermi National Accelerator Laboratory Sep. 2011, Batavia, IL, Fermilab-PUB-11-483-APC, 8 pages.

Peryshkin, A. et al., "On Sampling fractions and electron shower shapes," FERMILAB-PUB-12-004-E Dec. 2011, 12 pages.

(Continued)

Primary Examiner — David Porta
Assistant Examiner — Edwin Gunberg
(74) Attorney, Agent, or Firm — Luis M. Ortiz; Kermit D. Lopez; Ortiz & Lopez, PLLC

(57) ABSTRACT

A method and system for reducing background noise in a particle collider, comprises identifying an interaction point among a plurality of particles within a particle collider associated with a detector element, defining a trigger start time for each of the pixels as the time taken for light to travel from the interaction point to the pixel and a trigger stop time as a selected time after the trigger start time, and collecting only detections that occur between the start trigger time and the stop trigger time in order to thereafter compensate the result from the particle collider to reduce unwanted background detection.

17 Claims, 5 Drawing Sheets

(56) References Cited

OTHER PUBLICATIONS

Raja, R., "Towards a compensatable Muon Collider calorimeter with manageable backgrounds," Journal of Instrumentation (2012) vol. 7, April, 56 pages.

Wigmans, R., "Hardonic Showers," Calorimetry Energy Measurement in Particle Physics (2000) Oxford University Press Inc., New York, 4 pages.

* cited by examiner

COMPENSATABLE MUON COLLIDER CALORIMETER WITH MANAGEABLE BACKGROUNDS

STATEMENT OF GOVERNMENT RIGHTS

The invention disclosed in this application was made with Government support under the Fermi Research Alliance, LLC, contract Number DE-AC02-07CH11359 awarded by the U.S. Department of Energy. The Government has certain rights in the invention.

TECHNICAL FIELD

Embodiments are generally related to the field of collider detectors. Embodiments are also related to methods and systems for reducing background noise in Muon Collider detectors. Embodiments are additionally related to methods and systems for triggering a Muon Collider detector with a traveling gate and a vertex counting compensation technique to reduce background noise.

BACKGROUND OF THE INVENTION

Muon Collider detectors represent a means for studying high center of mass energies in lepton-antilepton colliding beams. Current collider designs allow for center of mass energies as high as 4 TeV. In the case of a 750 GeV/c beam, more than 4 million muon decays per meter in the beam pipe close to the interaction can be expected.

However, even with extensive shielding, these designs suffer from overwhelming background noise associated with a shower of electrons resulting from the decay of muons in the area surrounding the interaction region.

Considering, for example, a muon collider design of 1.5 TeV center of mass energy with a bunch intensity of $2 \times 10^{12}$ and one bunch circulating per beam, one could expect greater than 4 million muon decays per meter in the first turn. High energy electrons of average energy on the order of 250 GeV from the beam decays tend to exit the beam pipe and therefore require shielding in order to avoid severe background in the detector. This presents a significant challenge in effectively using a muon collider, unless some means are employed to address the problem.

Therefore, a need exists for a method and system to reduce the background in a muon collider and thereby improve the resulting data.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for reducing noise in a detector associated with a particle collider.

It is another aspect of the disclosed embodiments to provide for an enhanced method and system for triggering a detector element in a muon detector.

It is yet another aspect of the disclosed embodiments to provide an enhanced method and system for triggering a detector and compensating data in order to reduce the background in the detector.

The aforementioned aspects and other objectives and advantages can now be achieved as described herein. A method for reducing background noise in a particle collider comprises identifying an interaction point among a plurality of particles within a particle collider associated with a detector element, defining a trigger start time for each of the pixels as the time taken for light to travel from the interaction point to the pixel and a trigger stop time as a selected time after the trigger start time, and collecting only detections that occur between the start trigger time and the stop trigger time in order to thereafter compensate the result from the particle collider to reduce unwanted background detection.

The method further comprises compensating the result from the particle collider with a vertex counting technique. The particle collider can comprise a muon collider and the selected time associated with the trigger stop time can be 2 nanoseconds.

Further, the method can include the detector element comprising a calorimeter wherein each of the at least one pixel is formed to have a linear dimension of 200 microns and is configured to return a binary response indicate if a charged particle has passed through it. The plurality of particles can comprise at least one of mons, mesons, baryons, electrons, positrons, and photons.

Compensating the result from the particle collider with a vertex counting technique comprises counting the total number of hadronic vertices according to a pattern recognition technique, estimating the missing hadronic energy according to the total number of hadronic vertices, and deriving a calibration constant associated with the total number of hadronic vertices. Deriving the calibration constant associated with the total number of hadronic vertices is determined using a least squares minimization.

A system for reducing background noise in a particle collider comprises a detector element associated with a particle collider, a plurality of particles wherein the particles collide at an interaction point within the particle collider, at least one pixel associated with the detector element wherein each of the pixels is triggered at a trigger start time defined as the time taken for light to travel from the interaction point to the pixel and deactivated at a trigger stop time defined as a selected time after the trigger start time, and a data module configured to collect only detections that occur between the trigger start time and the trigger stop time in order to thereafter compensate the result from the particle collider to reduce unwanted background detection.

The particle collider can comprise a muon collider. The selected time associated with the trigger stop time can be 2 nanoseconds.

The system can be configured so that the detector element comprises a calorimeter wherein each of the pixels have a linear dimension of 200 microns and each of the pixels is configured to return a binary response indicating if a charged particle has passed through it. The particles can comprise at least one of muons, mesons, baryons, electrons, positrons, and photons.

The system further comprises a vertex configured for compensating a result from the particle collider with a vertex counting technique wherein compensating the result from the particle collider with the vertex counting technique comprises counting a total number of hadronic vertices according to a pattern recognition technique, estimating a missing hadronic energy according to the total number of hadronic vertices, and deriving a calibration constant associated with the total number of hadronic vertices. The calibration constant associated with the total number of hadronic vertices is determined using a least squares minimization.

A system for reducing background noise in a modeled particle collider comprises a processor, a data bus coupled to the processor, and a non-transitory computer-usable medium embodying computer code, the computer-usable medium being coupled to the data bus, the computer code comprising instructions executable by the processor configured for: modeling a detector dement associated with a modeled particle collider, identifying an interaction point of modeled particles within the modeled particle collider, defining a trigger start time for each pixel associated with the modeled calorimeter as a time taken for light to travel from the interaction point to the at least one pixel and a trigger stop time as a selected time after the trigger start time, and collecting only detections that occur between the start trigger time and the stop trigger time in order to thereafter compensate the result with a vertex counting technique, thereby reducing unwanted background detection.

The system of the model particle collider can comprise a modeled muon collider. The selected time associated with the trigger stop time can be 2 nanoseconds.

The modeled detector element comprises a modeled calorimeter, wherein the system further comprises modeling each of the pixels to have a linear dimension of 200 microns and configuring each of the pixels to return a binary response indicating if a charged particle has passed through it.

The system can include compensating a result from the modeled particle collider with a vertex counting technique that comprises counting a total number of hadronic vertices according to a pattern recognition technique, estimating a missing hadronic energy according to the total number of hadronic vertices, and deriving a calibration constant associated with the total number of hadronic vertices using a least squares minimization.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
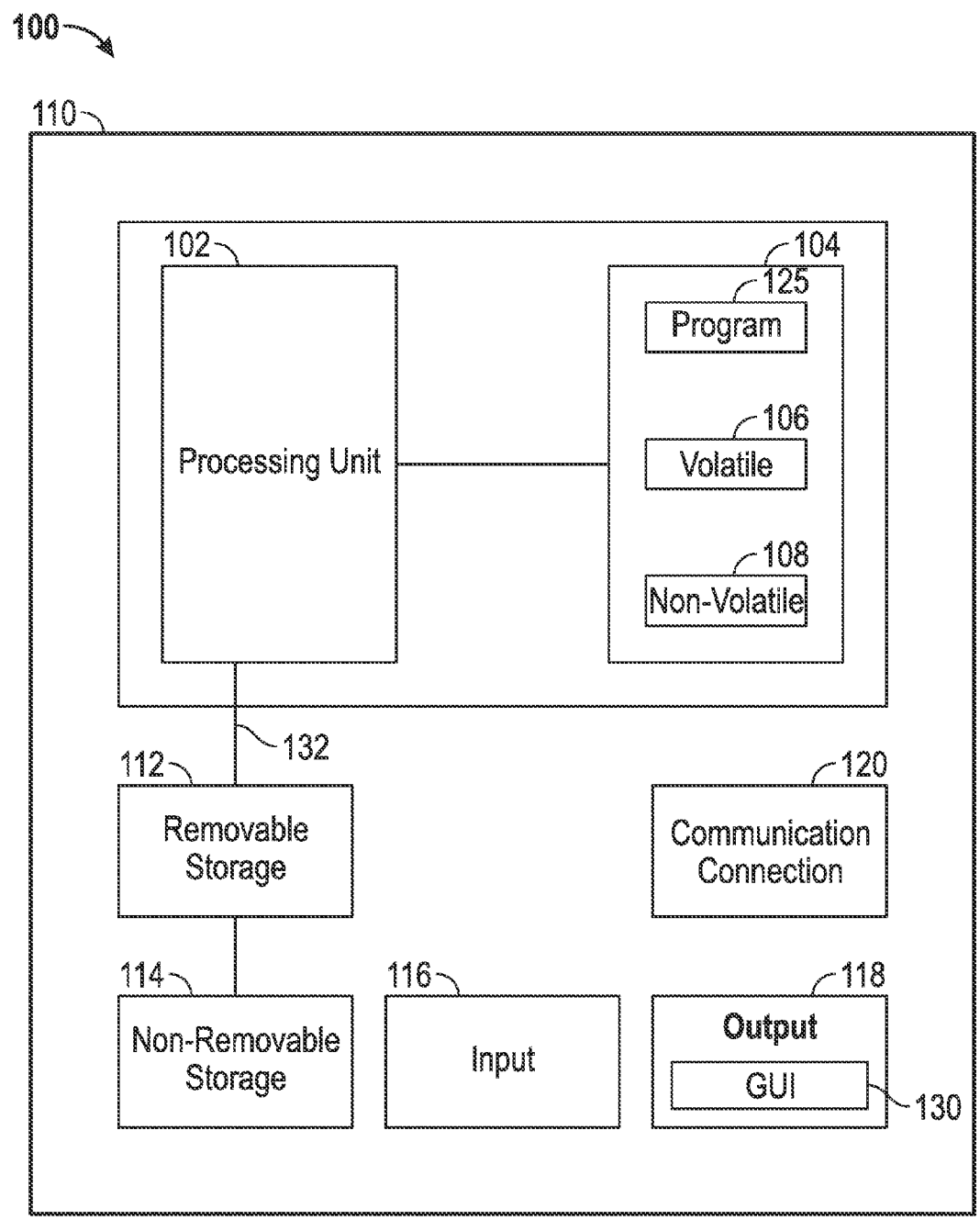
FIG. 1 depicts a block diagram of a computer system which is implemented in accordance with the disclosed embodiments.

A block diagram of a computer system 100 that executes programming for executing the methods and systems disclosed herein is shown in FIG. 1. A general computing device in the form of a computer 110 may include a processing unit 102, memory 104, removable storage 112, non-removable storage 114, and a data bus 132. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112, and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions, as well as data.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a detector associated with a particle collider. The communication connection may include a Local Area Network (LAN), a Wide Area Network (WAN) or other networks. This functionality is described in more detail in FIG. 2.

Output 118 is most commonly provided as a computer monitor but may include any computer output device. Output 118 may also include a data collection apparatus associated with computer system 100. In addition, input 116, which commonly includes a computer keyboard and/or pointing device such as a computer mouse, allows a user to select and instruct computer system 100. A user interface can be provided using output 118 and input 116.

Output 118 may function as a display for displaying data and information for a user and for interactively displaying a graphical user interface (GUI) 130.

Note that the term "GUI" generally refers to a type of environment that represents programs, files, options and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125 which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

Figure 2:
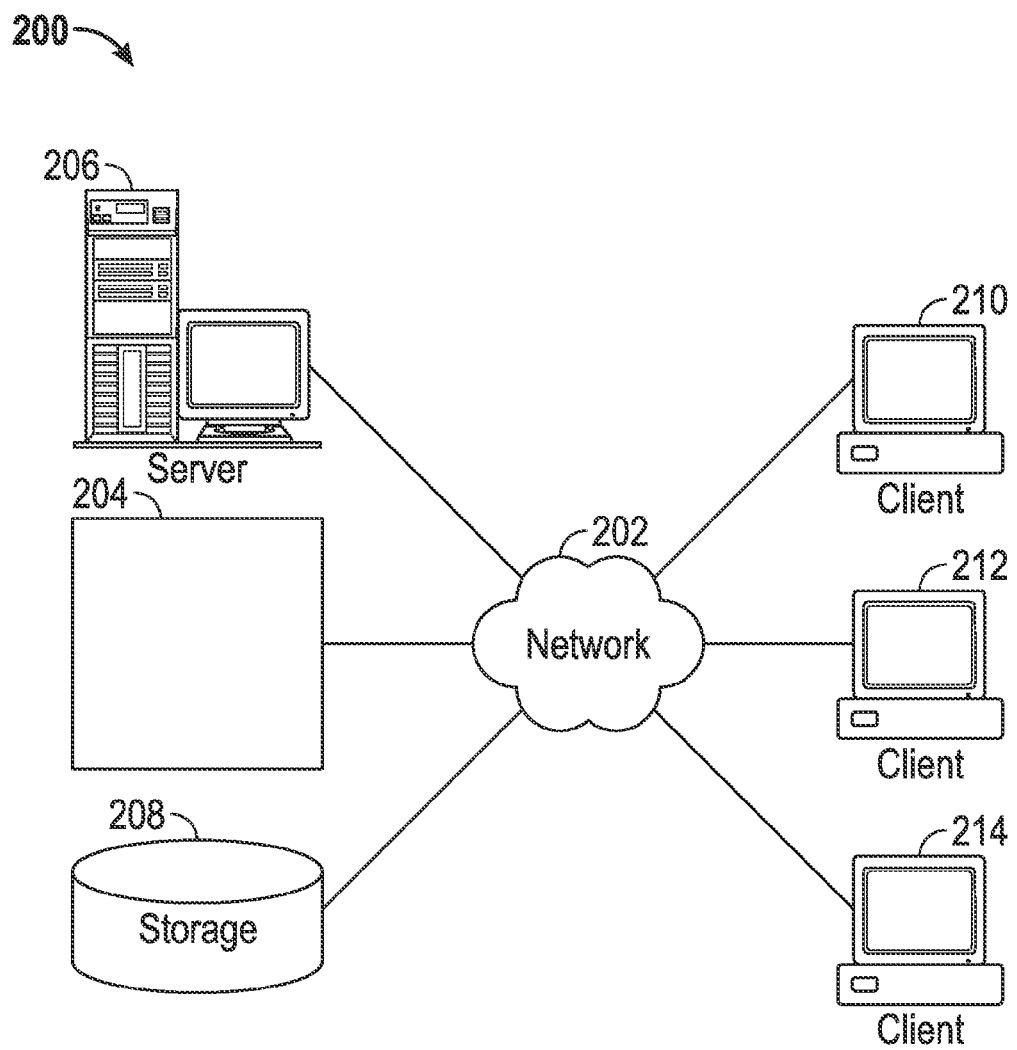
FIG. 2 depicts a graphical representation of a network of data-processing devices in which aspects of the present invention may be implemented.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as a detector associated with a particle collider 204, and a memory storage unit such as, for example, memory or database 208.

In the depicted example, the collider apparatus 204 and server 206 connect to network 202 along with storage unit 208. The clients 210, 212, and 214 may be, for example, personal computers or network computers. Computer system 100 depicted in FIG. 1 can be, for example, a client such as client 210, 212, and/or 214. In an alternative embodiment (not shown), clients 210, 212, and 214 may be, for example, a collector device associated with a collider 204 or other such detecting device.

Computer system 100 can also be implemented as a server such as server 206, depending upon design considerations. In the depicted example, server 206 provides data such as boot files, operating system images, applications, and application updates to clients 210, 212, and 214. Clients 210, 212, and 214 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

The following description is presented with respect to embodiments of the present invention, which can be embodied in the context of a data-processing system such as computer system 100, in conjunction with program module 125, data-processing system 200, and network 202 depicted in FIGS. 1 and 2. The present invention, however, is not limited to any particular application or any particular environment. Instead, those skilled in the art will find that the system and methods of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

Figure 3:
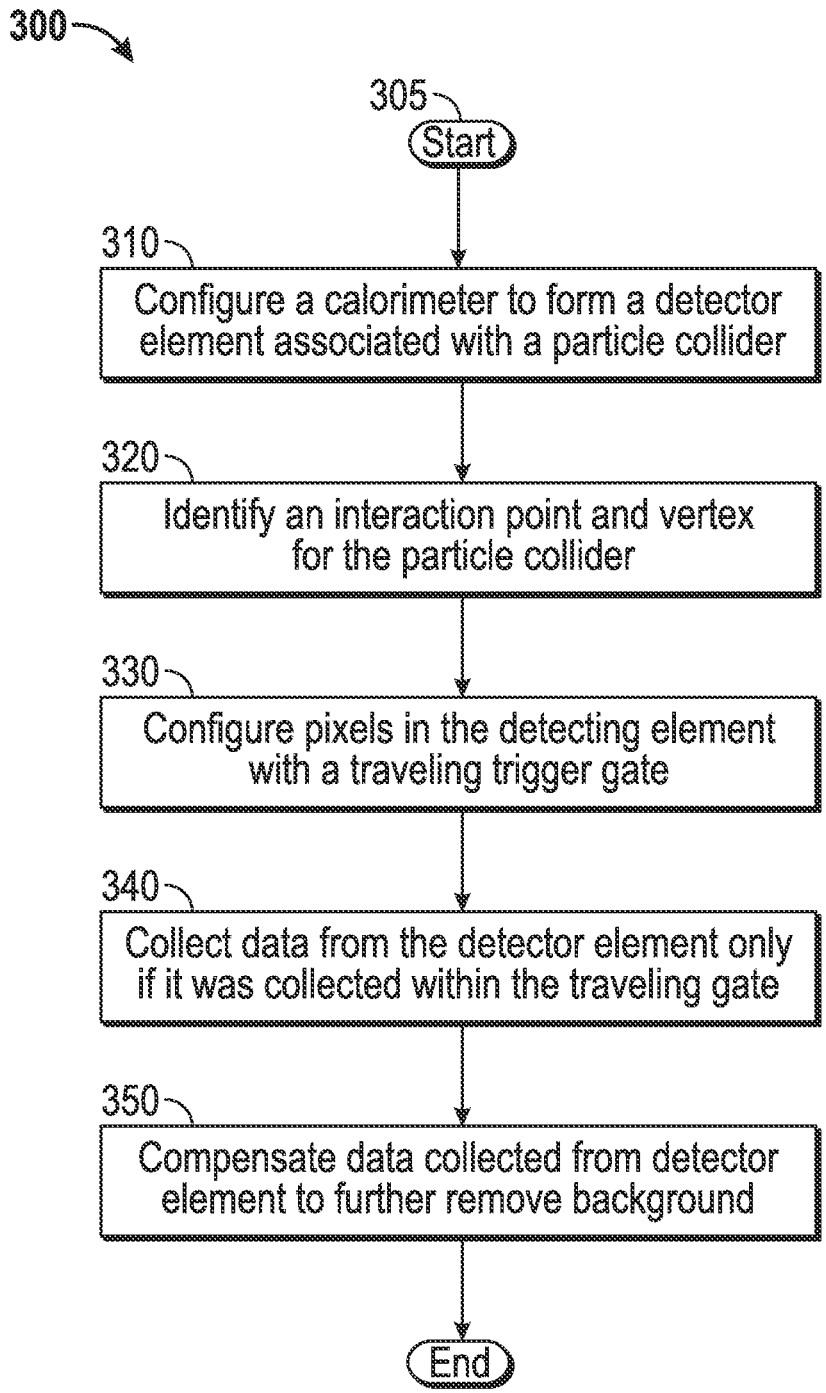
FIG. 3 depicts a high level flow chart illustrating logical operational steps in a method for implementing a traveling gate trigger in a particle collider, in accordance with the disclosed embodiments.

FIG. 3 illustrates a high level flow chart 300 of logical operations steps associated with a method for removing unwanted background from a particle collider. This method allows for the detection of a desired particle such as a muon in a particle collider by reducing unwanted background. The method begins at block 305.

Block 310 illustrates that a particle collider can be configured with an associated calorimeter for detecting particles. It should be noted that the methods and systems disclosed herein can be used in conjunction with a physical particle collider or a particle collider simulator embodied as a computer module, such as computer module 125, that models the systems and methods describe herein. In general, the particle collider can comprise a muon collider. However, colliders associated with other particles may also advantageously use the disclosed methods and systems. The collector device associated with the particle collider can include a 10° tungsten cone near the beam region to absorb as much of the EM shower as possible. However, this cone is insufficient to shield a significant number of soft particles such as photons, electrons, neutrons, protons, and mesons.

The calorimeter associated with the particle collider can be an iron calorimeter with 0.4 cm thick iron plates. The calorimeter provides a pixilated readout from pixels with a linear dimension of 200 microns. The pixels may, in a preferred embodiment, be made of silicon though other materials may also be used. Each pixel is individually triggerable and returns a binary yes/no bit indicating if a charged particle has passed through the pixel. The calorimeter can be configured to provide a readout scheme that only identifies pixels that have been hit being output for each event.

An interaction region and vertex can be defined as shown at block 320. The interaction region represents the point where the beams associated with the collider cross each other. This can be determined because the beams cross each other at a predictable time on each turn through the collider. The vertex represents the trajectory of particle from the interaction region to detection, A travelling gate trigger can next be applied to each pixel as described at block 330. The travelling gate trigger takes advantage of the fact that if at the vertex point any particle is later than the end of the travelling gate at the vertex, then for all subsequent times that particle and all its secondary particles will reach the detector later than the end of the travelling gate anywhere on the detector. Therefore, all the particles that do not reach the detector within the travelling gate can be ignored. This point can be mathematically expressed as follows.

First the units are applied such that the velocity of light is unity. Allow $t_M$ to denote the time when the particle arrives at the vertex M and allow $t^M_{light}$ to denote the time taken for light to go from the interaction point O to the vertex M. Let g denote the gate width. Because the particle arrives at the vertex M later than the end of the travelling gate trigger formula (1) states:

$$t_M > t^M_{light} + g > OM + g \qquad (1)$$

Now allow $t_p$ to denote the arrival time of the particle at P travelling from M. Then formula (2) holds:

$$t_p = t_m + t_{MP} \qquad (2)$$

For a particle of velocity β, formula (3) represents the time for the particle to travel from M to P.

$$t_{MP} = MP/\beta \qquad (3)$$

And because β<1, this leads to formula (4).

$$t_P > OM + MP + g \qquad (4)$$

The line defined by OP is straight and therefore a straight line is the shortest distance between O and P. Therefore according to Euclidean Geometry formal (5) leads to formula (6).

$$OM+MP>OP \qquad (5)$$

$$t_p > t_{light} + g \qquad (6)$$

Therefore, according to formula (6) the particle arrival at P is certain to be later than the end of the travelling gate at P. This applies not only to the particle under consideration but also to all secondary particles caused by any interaction the particle may undergo in the detector. Thus, all these particles can be ignored, which significantly reduces the background noise associated with particle detection.

Now let M denote the point at which a particle that passes formula (6) just comes into the travelling gate. Further let R denote the distance OM and θ denote the angle 180 degrees, OMP. Also, let d denote the distance MP during which the particle will remain in the gate, going out of the gate at point P. Then for a particle where β=1 (i.e., the speed of light) formula (7) holds:

$$d=(g(g-2R))/(2(g-R(1-\cos\theta))) \qquad (7)$$

Once the traveling gate trigger has been applied to each pixel in the detector, block 340 explains that the data from the detector can be limited to those interactions detected within the travelling gate.

For example, in muon detection applications each pixel can be triggered with a gate of 2 ns, which starts at the time taken by light to travel from the interaction region to the pixel. Thus, all pixels within a fixed radius from the interaction point will have the same trigger gate. Furthermore, each pixel can pass its trigger to neighboring pixels by delaying the neighboring pixel electronically by the appropriate amount. Since interaction at the crossing of the beams is not guaranteed, the detector can be triggered at each crossing so that the pixels are live for a period of time, though not all at the same time. Because the start time will be different for different parts of the detector, the live time of the detector will travel at the speed of light starting at the interaction point when the beams cross. After the travelling gate has run through the detector, the calorimeter readout can be preformed during the interval until the next beam crossing which will occur some fraction of a second later.

At block 350, the data can be compensated to further remove background. This compensation can be achieved either through hardware or software implementations. Hardware compensation can take advantage of the fact that detected protons near their Bragg peak will deposit an energy per distance in the calorimeter medium that is significantly higher than a minimum ionizing particle. However, in the event that the calorimeter is purely digital, this method of compensation cannot be used since the information is limited to a binary response.

Another hardware compensation technique includes a dual readout calorimeter where two types of readouts digitize a different mixture of scintillation and Chernenkov light from the shower. Because the respective readouts have different sensitivities to hadronic and electromagnetic tracks, they can be used to compensate for the hadronic energy loss.

Figure 4:
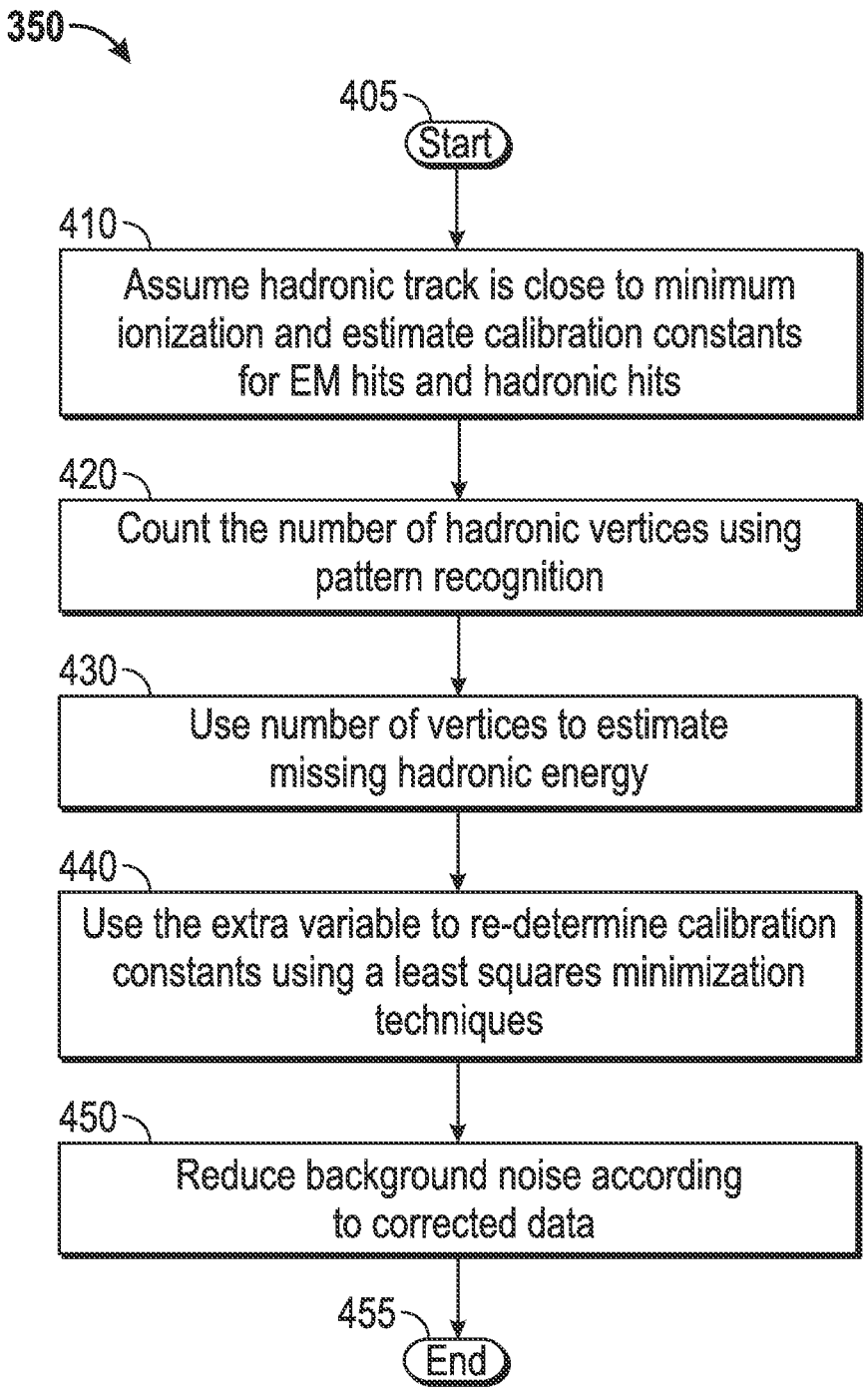
FIG. 4 depicts a high level flow chart illustrating logical operational steps in a method for compensating the result from a particle collider with a vertex counting technique, in accordance with the disclosed embodiments.

In a preferred embodiment, a software compensation technique 350 is used. Logical operational steps for implementation of a software compensation technique are illustrated in FIG. 4. The method starts at block 405. In calorimeters that are sufficiently granular, it is possible to distinguish between hadronic tracks and EM shower tracks by the density of their hits in a given region of the detector. A pattern recognition technique can be used to evaluate the density of hits at the detector associated with the EM shower and with the hadronic tracks.

A vertex counting technique can be used in the aforementioned software compensation technique. The change in energy over distance deposited by the hadronic tracks at the detector is nearly equivalent to the EM tracks provided that the hadronic track is dose to minimum ionization. However, the difference can be identified in the energy lost during nuclear interactions. Thus, separating EM and hadronic hits, assuming different calibration constants for EM hits and hadronic hits, is essentially an exercise in estimating the number of hadronic nuclear interactions based on the number of hadronic hits at the detector, as shown at block 410.

At block 420, the described digital calorimeter can count the number of hadronic vertices using pattern recognition. Next, block 430 explains that the number of vertices can be used to directly estimate the missing hadronic energy. With this extra variable available (e.g., the number of hadronic vertices), the calibration constants associated with the hits and number of vertices can be predetermined using a least squares minimization technique described at block 440. The corrected data is thus used to reduce the background noise at block 450 and the method ends a block 455.

Figure 5:
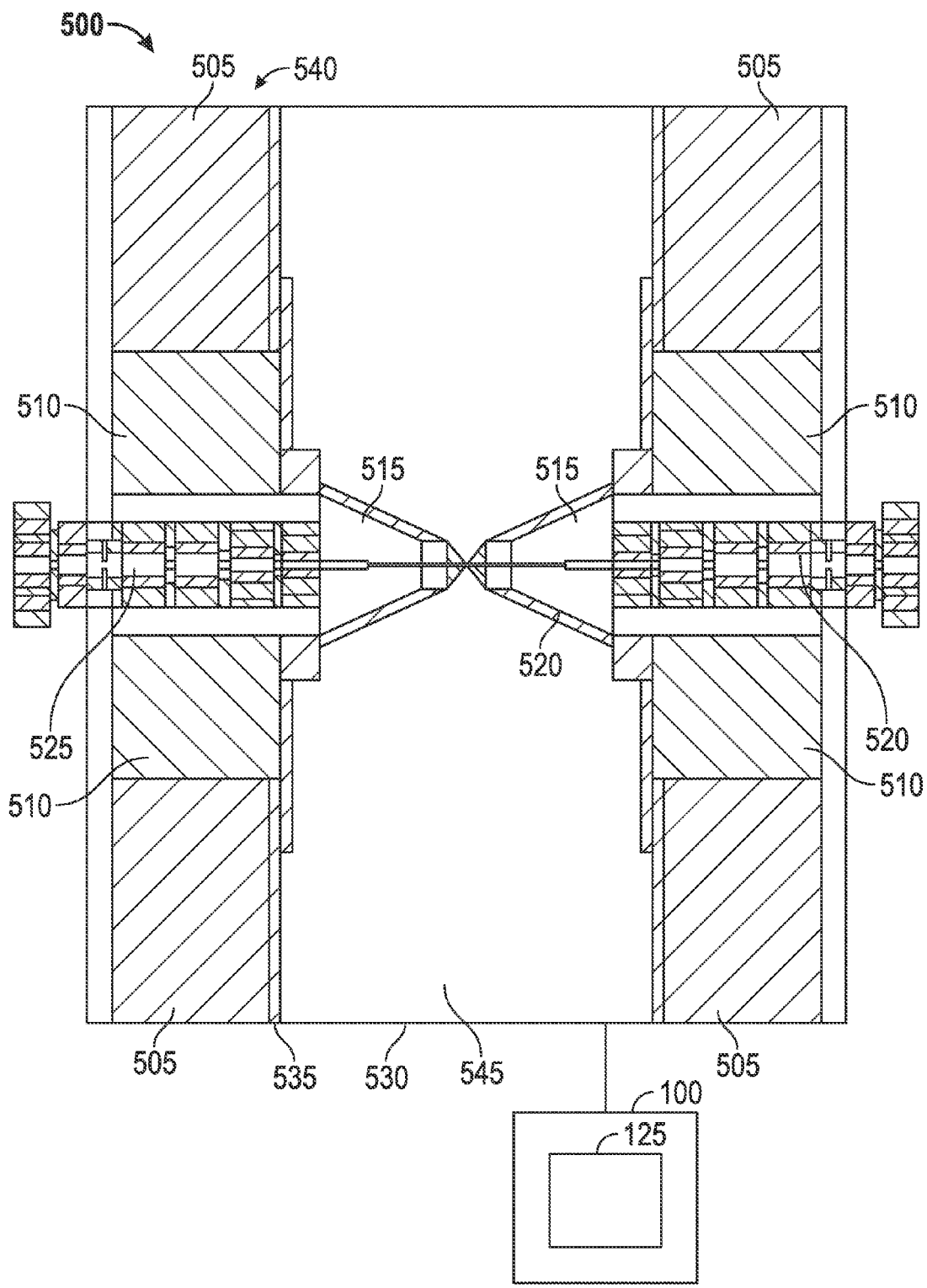
FIG. 5 depicts a block diagram of a detector element associated with a particle collider, in accordance with the disclosed embodiments.

FIG. 5 illustrates a block diagram 500 of a calorimeter forming a detector element 540 associated with a particle collider 535. It should be appreciated that this arrangement may represent an actual physical calorimeter forming a detector element associated with a particle collider. Alternatively, FIG. 5 can be implemented as simulation of a particle collider such as a MARS simulation. In a MARS simulation, a MARS vertex represents the point where MARS stops tracking and allows a GEANT to begin tracking the track.

The detector element 540 associated with a particle collider 535 includes a calorimeter volume 530. Calorimeter volume 530 includes a calorimeter that can be an iron calorimeter with 0.4 cm think iron plates. The calorimeter provides a pixilated readout from pixels 545 contained therein with a linear dimension of 200 microns. The pixels 545 may, in a preferred embodiment, be made of silicon though other materials may also be used. Each pixel 545 is individually triggerable and returns a binary yes/no bit indicating if a charged particle has passed through the pixel 545 to computer 100 to be processed by module 125, which can, for example, compensate the collected data to further remove background noise.

The detector includes shielding 505 as well as thicker shielding 510. Shielding 505 and thicker shielding 510 are designed to prevent errant detections resulting from, for example, EM showers. However, module 125 can further send signals to the calorimeter 530 pixels 545 to create a traveling gate trigger wherein the pixel 545 is made active for detection as described above during the traveling gate.

Detector element 540 associated with particle collider 535 further includes magnets 525 for bending and/or focusing particles, and tungsten cones 515 coated with a Boron coating 520. The tungsten cone provides an additional shield against the last stages of a shower associated with a background event. In a preferred embodiment the tungsten cone can be a 10° tungsten cone.

When a particle enters the calorimeter volume 530, it can be passed via module 125 to a detector program module. The data provided to the detector program module 125 can include data indicative of vertex, four vector time of arrival, and weight of the detected particle.

Based on the foregoing, it can be appreciated that a number of embodiments, preferred and alternative, are disclosed herein. For example, in one embodiment, a method for reducing background noise in a particle collider, comprises identifying an interaction point among a plurality of particles within a particle collider associated with a detector element, defining a trigger start time for each of the pixels as the time taken for light to travel from the interaction point to the pixel and a trigger stop time as a selected time after the trigger start time, and collecting only detections that occur between the start trigger time and the stop trigger time in order to thereafter compensate the result from the particle collider to reduce unwanted background detection.

The method further comprises compensating the result from the particle collider with a vertex counting technique. The particle collider can comprise a muon collider and the selected time associated with the trigger stop time can be 2 nanoseconds.

Further, the method can include the detector element comprising a calorimeter wherein each of the at least one pixel is formed to have a linear dimension of 200 microns and is configured to return a binary response indicate if a charged particle has passed through it. The plurality of particles can comprise at least one of muons, mesons, baryons, electrons, positrons, and photons.

Compensating the result from the particle collider with a vertex counting technique comprises counting the total number of hadronic vertices according to a pattern recognition technique, estimating the missing hadronic energy according to the total number of hadronic vertices, and deriving a calibration constant associated with the total number of hadronic vertices. Deriving the calibration constant associated with the total number of hadronic vertices is determined using a least squares minimization.

A system for reducing background noise in a particle collider comprises a detector element associated with a particle collider, a plurality of particles wherein the particles collide at an interaction point within the particle collider, at least one pixel associated with the detector element wherein each of the pixels is triggered at a trigger start time defined as the time taken for light to travel from the interaction point to the pixel and deactivated at a trigger stop time defined as a selected time after the trigger start time, and a data module configured to collect only detections that occur between the trigger start time and the trigger stop time in order to thereafter compensate the result from the particle collider to reduce unwanted background detection.

The particle collider can comprise a muon collider. The selected time associated with the trigger stop time can be 2 nanoseconds.

The system can be configured so that the detector element comprises a calorimeter wherein each of the pixels have a linear dimension of 200 microns and each of the pixels is configured to return a binary response indicating if a charged particle has passed through it. The particles can comprise one or more of, for example, muons, mesons, baryons, electrons, positrons, and photons.

The system can further include a vertex configured for compensating a result from the particle collider with a vertex counting technique wherein compensating the result from the particle collider with the vertex counting technique comprises counting a total number of hadronic vertices according to a pattern recognition technique, estimating a missing hadronic energy according to the total number of hadronic vertices, and deriving a calibration constant associated with the total number of hadronic vertices. The calibration constant associated with the total number of hadronic vertices can be determined utilizing a least squares minimization.

A system can be provided for reducing background noise in a modeled particle collider comprising of a processor, a data bus coupled to the processor, and a non-transitory computer-usable medium embodying computer code, the computer-usable medium being coupled to the data bus, the computer code comprising instructions executable by the processor configured for: modeling a detector element associated with a modeled particle collider, identifying an interaction point of modeled particles within the modeled particle collider, defining a trigger start time for each pixel associated with the modeled calorimeter as a time taken for light to travel from the interaction point to the at least one pixel and a trigger stop time as a selected time after the trigger start time, and collecting only detections that occur between the start trigger time and the stop trigger time in order to thereafter compensate the result with a vertex counting technique, thereby reducing unwanted background detection.

The system of the model particle collider can comprise a modeled muon collider. The selected time associated with the trigger stop time can be 2 nanoseconds.

The modeled detector element comprises a modeled calorimeter, wherein the system further comprises modeling each of the pixels to have a linear dimension of 200 microns and configuring each of the pixels to return a binary response indicating if a charged particle has passed through it.

Based on the foregoing, it can be appreciated that a number of embodiments, preferred and alternative, are disclosed herein. For example, in one embodiment, a method can be implemented for reducing background noise in a particle collider. Such a method can include, for example, the steps or logical operations of identifying an interaction point among a plurality of particles within a particle collider associated with a detector element; defining a trigger start time for each of at least one pixel as a time taken for light to travel from the interaction point to the at least one pixel and a trigger stop time as a selected time after the trigger start time; and collecting only detections that occur between the start trigger time and the stop trigger time in order to thereafter compensate a result from the particle collider to reduce unwanted background detection.

In another embodiment, a step or logical operation can be implemented for compensating the result from the particle collider with a vertex counting technique, thereby reducing the unwanted background detection. In still another embodiment, the particle collider can comprise a muon collider. In another embodiment, the selected time associated with the trigger stop time can be 2 nanoseconds. In yet another embodiment, the detector element can comprise a calorimeter and the aforementioned can further include the steps of logical operations of forming each of the at least one pixel to have a linear dimension of, for example, 200 microns; and configuring each of the at least one pixel to return a binary response indicating if a charged particle has passed through it.

In other embodiments, the aforementioned particles can include one or more of, for example, muons; mesons; baryons; electrons; positrons; and photons. In yet another embodiment, the step or logical operation of compensating a result from the particle collider with a vertex counting technique can further comprise steps or logical operations for counting a total number of hadronic vertices according to a pattern recognition technique; estimating a missing hadronic energy according to the total number of hadronic vertices; and deriving a calibration constant associated with the total number of hadronic vertices. In still another embodiment, a step or logical operation can be provided for deriving the calibration constant associated with the total number of hadronic vertices which is determined using a least squares minimization.

In another embodiment, a system for reducing background noise in a particle collider comprising can be implemented. Such a system can include, for example, a detector element associated with a particle collider; a plurality of particles wherein the particles collide at an interaction point within the particle collider; at least one pixel associated with the detector element wherein each of the at least one pixel is triggered at a trigger start time defined as a time taken for light to travel from the interaction point to the at least one pixel and deactivated at a trigger stop time defined as a selected time after the trigger start time; and a data module configured to collect only detections that occur between the trigger start time and the trigger stop time in order to thereafter compensate a result from the particle collider to reduce unwanted background detection.

In another embodiment, the aforementioned particle collider can comprise a muon collider. In yet another embodiment, the selected time associated with the trigger stop time can be 2 nanoseconds. In still another embodiment, the detector element can comprise a calorimeter wherein each of the at least one pixel has a linear dimension of, for example, 200 microns, and each of the at least one pixel can be configured to return a binary response indicating if a charged particle has passed through it. In other system embodiments, the aforementioned particles can include one or more of, for example, muons; mesons; baryons; electrons; positrons; and photons.

In yet another embodiment, a vertex can be configured for compensating a result from the particle collider with a vertex counting technique wherein compensating the result from the particle collider with the vertex counting technique comprises counting a total number of hadronic vertices according to a pattern recognition technique, estimating a missing hadronic energy according to the total number of hadronic vertices, and deriving a calibration constant associated with the total number of hadronic vertices. In another embodiment, the calibration constant associated with the total number of hadronic vertices can be determined using a least squares minimization.

In still another embodiment, a system can be implemented for reducing background noise in a modeled particle collider, the system comprising a processor, a data bus coupled to the processor, and a computer-usable medium embodying computer code, the computer-usable medium being coupled to the data bus. Such computer code can comprise instructions executable by the processor and configured for modeling a detector element associated with a modeled particle collider, identifying an interaction point of a plurality of modeled particles within the modeled particle collider, defining a trigger start time for each of at least one pixel associated with the modeled calorimeter as a time taken for light to travel from the interaction point to the at least one pixel and a trigger stop time as a selected time after the trigger start time; and collecting only detections that occur between the start trigger time and the stop trigger time in order to thereafter compensate a result from the modeled particle collider with a vertex counting technique, thereby reducing unwanted background detection. In another embodiment of such a system, the model particle collider can comprise a modeled muon collider. In another embodiment, the selected time associated with the trigger stop time can be 2 nanoseconds.

In yet another embodiment, the modeled detector element can be a modeled calorimeter, and the aforementioned instructions can further comprise instructions for modeling each of the at least one pixel to have a linear dimension of, for example, 200 microns, and configuring each of the at least one pixel to return a binary response indicating if a charged particle has passed through it.

In still another embodiment, the aforementioned instructions for compensating a result from the modeled particle collider with a vertex counting technique can further comprise instructions configured for counting a total number of hadronic vertices according to a pattern recognition technique, estimating a missing hadronic energy according to the total number of hadronic vertices, and deriving a calibration constant associated with the total number of hadronic vertices using a least squares minimization.

The system can include compensating a result from the modeled particle collider with a vertex counting technique that comprises counting a total number of hadronic vertices according to a pattern recognition technique, estimating a missing hadronic energy according to the total number of hadronic vertices, and deriving a calibration constant associated with the total number of hadronic vertices using a least squares minimization.

What is claimed is:

1. A method for reducing background noise in a particle collider, said method comprising:
    identifying an interaction point among a plurality of particles within a particle collider associated with a detector element;
    defining a trigger start time for each of at least one pixel as a time taken for light to travel from said interaction point to said at least one pixel and a trigger stop time as a selected time after said trigger start time;
    collecting only detections that occur between said start trigger time and said stop trigger time;
    counting a total number of hadronic vertices according to a pattern recognition technique;
    estimating a missing hadronic energy according to said total number of hadronic vertices; and
    deriving a calibration constant associated with said total number of hadronic vertices in order to thereafter compensate a result from said particle collider to reduce unwanted background detection.

2. The method of claim 1 further comprising compensating said result from said particle collider with a vertex counting technique, thereby reducing said unwanted background detection.

3. The method of claim 1 wherein said particle collider comprises a muon collider.

4. The method of claim 1 wherein said selected time associated with said trigger stop time is 2 nanoseconds.

5. The method of claim 1 wherein said detector element comprises a calorimeter, said method further comprising:
    forming each of said at least one pixel to have a linear dimension of 200 microns; and
    configuring each of said at least one pixel to return a binary response indicating if a charged particle has passed through it.

6. The method of claim 1 wherein said plurality of particles comprise at least one of:
    Muons;
    Mesons;
    Baryons;
    Electrons;
    Positrons; and
    Photons.

7. The method of claim 6 wherein deriving said calibration constant associated with said total number of hadronic vertices is determined using a least squares minimization.

8. A system for reducing background noise in a particle collider comprising:
- a detector element associated with a particle collider;
- a plurality of particles wherein said particles collide at an interaction point within said particle collider;
- at least one pixel associated with said detector element wherein each of said at least one pixel is triggered at a trigger start time defined as a time taken for light to travel from said interaction point to said at least one pixel and deactivated at a trigger stop time defined as a selected time after said trigger start time; and
- a data module configured to collect only detections that occur between said trigger start time and said trigger stop time in order to thereafter compensate a result from said particle collider to reduce unwanted background detection by compensating said result from said particle collider with a vertex counting technique comprising:
- counting a total number of hadronic vertices according to a pattern recognition technique;
- estimating a missing hadronic energy according to said total number of hadronic vertices; and
- deriving a calibration constant associated with said total number of hadronic vertices.

9. The system of claim 8 wherein said particle collider comprises a muon collider.

10. The system of claim 9 wherein said selected time associated with said trigger stop time is 2 nanoseconds.

11. The system of claim 8 wherein said detector element comprises a calorimeter wherein each of said at least one pixel has a linear dimension of 200 microns; and
- each of said at least one pixel is configured to return a binary response indicating if a charged particle has passed through it.

12. The system of claim 8 wherein said plurality of particles comprise at least one of:
- Muons;
- Mesons;
- Baryons;
- Electrons;
- Positrons; and
- Photons.

13. The system of claim 8 wherein said calibration constant associated with said total number of hadronic vertices is determined using a least squares minimization.

14. A system for reducing background noise in a modeled particle collider said system comprising:
- a processor;
- a data bus coupled to said processor; and
- a computer-usable medium embodying computer code, said computer-usable medium being coupled to said data bus, said computer code comprising instructions executable by said processor configured for:
- modeling a detector element associated with a modeled particle collider;
- identifying an interaction point of a plurality of modeled particles within said modeled particle collider;
- defining a trigger start time for each of at least one pixel associated with said modeled calorimeter as a time taken for light to travel from said interaction point to said at least one pixel and a trigger stop time as a selected time after said trigger start time;
- collecting only detections that occur between said start trigger time and said stop trigger time;
- counting a total number of hadronic vertices according to a pattern recognition technique;
- estimating a missing hadronic energy according to said total number of hadronic vertices; and
- deriving a calibration constant associated with said total number of hadronic vertices in order to thereafter compensate a result from said particle collider to reduce unwanted background detection.

15. The system of claim 14 wherein said model particle collider comprises a modeled muon collider.

16. The system of claim 15 wherein said selected time associated with said trigger stop time is 2 nanoseconds.

17. The system of claim 14 wherein said modeled detector element comprises a modeled calorimeter, and said instructions are further configured for:
- modeling each of said at least one pixel to have a linear dimension of 200 microns; and
- configuring each of said at least one pixel to return a binary response indicating if a charged particle has passed through it.

* * * * *